MOLYBDENUM OXIDE CONTAINING HIGH PERMEABILITY
ZINC-MANGANESE FERRITE
Original Filed Feb. 5, 1959
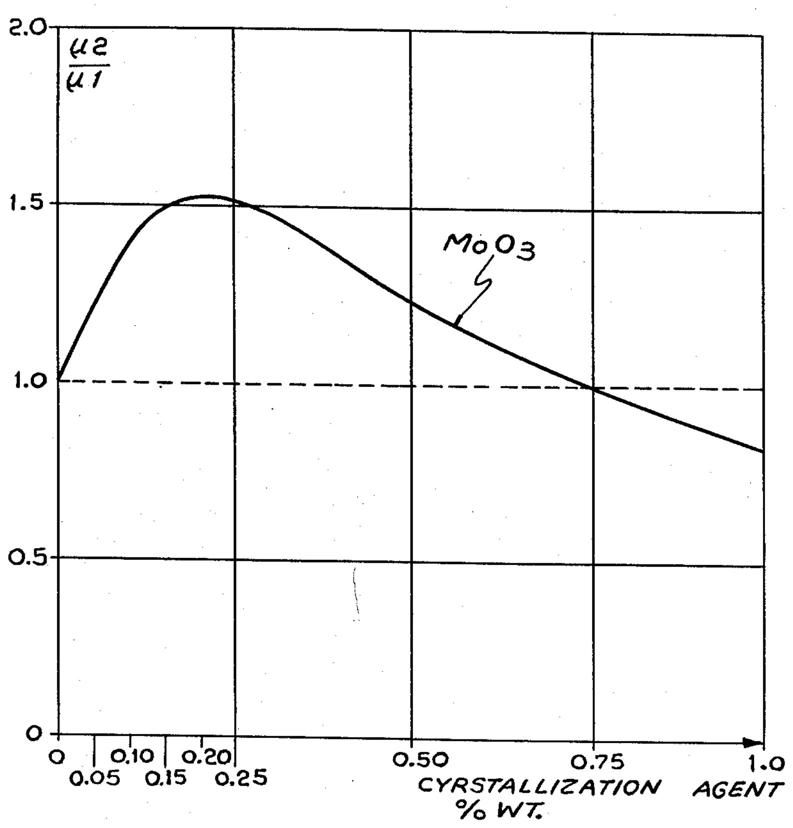
INVENTORS.
ANDRE PIERROT
YVES LESCROEL
BY
ATTORNEY United States Patent Office 3,180,833 Patented Apr. 27, 1965

3,180,833
MOLYBDENUM OXIDE CONTAINING HIGH PERMEABILITY ZINC-MANGANESE FERRITE

André Pierrot and Yves Lescroel, Conflans-Sainte-Honorine, France, assignors to International Telephone and Telegraph Corporation, New York, N.Y., a corporation of Maryland Original application Feb. 5, 1959, Ser. No. 791,405, now Patent No. 3,057,802, dated Oct. 2, 1962. Divided and this application July 16, 1962, Ser. No. 209,996
Claims priority, application France, Feb. 13, 1958, 758,176
1 Claim. (Cl. 252—62.5)

This is a division of application Serial No. 791,405, filed February 5, 1959, now Patent No. 3,057,802, granted October 2, 1962.

The present invention relates to ferro-magnetic materials of the "ferrite" type, for use in the art of telecommunications, electronics and electrotechnics for transformer cores, inductance coils and any other application for which it is necessary to have a soft magnetic material with high permeability and low losses.

The definitions of the coefficients employed to characterize the magnetic materials obtained in accordance with the invention are given in the following:

The permeability $\mu$ indicated is the permeability measured for a field of 2 millioersteds, i.e. the "initial" permeability for a frequency of 800 c./s. at the temperature of 20° C.

The coefficients of losses employed are the coefficients defined for a frequency of 800 c./s., a field of 1 ampere-turn per centimetre, and an inductance of 1 henry at the temperature of 20° C., in accordance with the relation:

$$R_p=F_n\cdot\frac{f^2}{800^2}\cdot L+h\cdot\frac{N.I.}{l_{nm}}=\frac{f}{800}\cdot L+t\cdot\frac{f}{800}\cdot L \qquad (1)$$

in which:

$R_p$ is the resistance of losses in alternating current in the magnetic core of an inductance coil, in ohms;
L is the inductance of said coil in henrys;
$f$ is the frequency, in cycles per second;
N is the number of turns of the winding of the coil;
I is the effective value of the current in the winding, in amperes;
$l_{nm}$ is the length of the mean magnetic line of force, in cm.

The coefficients of eddy current losses $F_n$, of hysteresis $h$ and of "trainage" $t$ relating to a continuous magnetic circuit, have been measured under the following conditions:

The coefficient of eddy current losses $F_n$ is expressed in ohms per henry, for the frequency 800 c./s., measured for a field of 2 millioersteds and at a temperature of about 20° C., for magnetic circuits of which the cross-section is about 0.3 cm.$^2$ (0.5 x 0.6 cm.);

The coefficient of hysteresis losses $h$, expressed in ohms per henry, for a field of $$\frac{N.I}{l_{nm}}=1 \text{ a.t./cm.}$$

and for the frequency $f$=800 c./s., is measured between fields of 2 and 22 millioersteds, at the frequency 800 c./s. and at the temperature of approximately 20° C.;

The coefficient of "trainage" losses $t$, expressed in ohms per henry and for the frequency $f$=800 c./s., is deduced from the ordinate at the origin of the curves $$\frac{R_p}{f.L}=F(f)$$

for a zero field, at a temperature of about 20° C. According to (1), in effect, for $f$=0 and $I$=0, we have;

$$\frac{R_p}{f.L}=\frac{t}{800}$$

hence we deduce $t$.

The coefficients $F_n$, $h$ and $t$ indicated relate to continuous circuits without airgap and are of particular interest for transformers without airgap.

The coefficients $$\frac{F_n}{\mu}\cdot 10^3, \frac{h}{\mu_2}\cdot 10^6 \text{ and } \frac{t}{\mu}\cdot 10^3$$

have been introduced, which make it possible to judge the quality of the various materials, and do not depend on the airgap, if any.

It is, moreover, well known that it is desirable in telecommunication to produce, in as small as possible a volume, transformers with as large as possible a passband, and having a very low attenuation in that band. This necessitates the use of materials with high initial permeability and low losses.

One particular object of the invention is to obtain magnetic materials fulfilling these conditions.

In accordance with the present invention, magnetic materials of the ferrite type are provided, particularly ferrites of manganese-zinc, characterized by the addition to the basic composition of a crystallizing agent of which the content is between 0.02 and 2% of the weight of the mixture, which causes the material to have an initial permeability higher than 3000 and which might reach 6000.

In particular, the basic ferrites of manganese-zinc to which the invention relates are ferrites of which the composition comprises a molecular proportion of ferric oxide $Fe_2O_3$ substantially equal to 50%, a content by weight of FeO comprised between 0 and 5%, and molecular proportions of manganese oxide MnO and zinc oxide ZnO respectively comprised between 25 and 30% and between 15 and 25%, as described and claimed in British specification 730,703. It has moreover been found that for these materials, for best results, the diameter of the grains must be as uniform as possible and comprised between 10 and 30 microns.

Molybdenum oxide ($MoO_3$) is used as a crystallizing agent which makes it possible to obtain a very homogeneous granular structure with large grains. Its action is particularly to reduce the temperature of preparation of the ferrite.

Owing to the fact that, in the starting mixture used in preparing the ferrite, the crystallizing agent is introduced into the mixture of oxides, the contents indicated are related to the total mass of the components of the starting mixture, in which iron is considered in the form of $Fe_2O_3$ and the other constituents in the form of MeO, Me representing the bivalent metal or metals.

In order to obtain the permeability claimed, it is very important to use very pure starting raw materials. As is said in the British specification above referred to, the most harmful impurities are barium and strontium.

The invention will be better understood with reference to the drawing and to the following example.

The figure represents variations of the ratio $\mu_2/\mu_1$ as a function of the percentage of molybdenum oxide added, $\mu_1$ being the initial permeability without the additive and $\mu_2$ being the initial permeability with the additive, for a starting composition:

| | |
|---|---|
| $Fe_2O_3$ | 52.5 |
| MnO | 28.3 |
| ZnO | 19.2 |

and for annealing for four hours at 1,240° C. in pure nitrogen, containing 1% oxygen, followed by cooling for 15 hours in pure nitrogen.

It will be seen that the permeability is improved up to about 50% of its original value, for certain quantities of crystallization agent preferably taken within the following value: $MoO_3$—0.07 to 0.30%, by weight of the mixture.

The following example, which is given to permit a better understanding of the invention, is not limitative.

The example given relates to the same composition of the starting mixture without crystallization agent, that is, in molecular percentages:

| | |
|---|---|
| $Fe_2O_3$ | 52.5 |
| MnO | 28.3 |
| and | |
| ZnO | 19.2 |

for the example, the treatment is the same as that indicated in the following for the material without crystallization agent. The crystallization agent is added to the starting mixture before grinding.

The oxides in the proportions indicated above are ground for from 24 to 28 hours in a steel mill with steel balls, the water added being equal in litres to about 1.5 times the weight of the material in kilogrammes.

The material, after being filtered and dried, is compressed into cores at a pressure of about 1 to 10 tons per cm.², for example 5 tons per cm.².

The cores passed into the stove at 200° C. for evaporation of the organic binding agent possibly employed during compression, are annealed in a nitrogen atmosphere containing about 1% oxygen. The temperature is 1,240° C., the duration four hours and the cooling is carried out for about 15 hours in pure nitrogen. The cooling of the annealed substance is extremely important, because it is during this cooling that the excess of trivalent ions of $Fe_2O_3$ is transformed into bivalent ions, leading to a material containing as many molecules of trivalent ions as molecules of bivalent ions and having very good magnetic properties.

The material obtained in this way has the following characteristics:

$$\mu=2,600$$

$$\frac{F_n}{\mu}\cdot 10^3=0.5$$

$$\frac{h}{\mu 2}\cdot 10^6=200$$

$$\frac{t}{\mu}\cdot 10^3=5, \text{ and}$$

Curie point $\theta_0 \simeq 170°$ C.

*Example*

For a product having the starting composition previously indicated, and to which has been added 0.20% by weight of molybdenum oxide $MoO_3$, and treated in the manner described, the magnetic properties are as follows:

$$\mu=3,900$$

$$\frac{F_n}{\mu}\cdot 10^3=1.50$$

$$\frac{h}{\mu 2}\cdot 10^6=300$$

$$\frac{t}{\mu}\cdot 10^3=20$$

While the principles of the invention have been described above in connection with specific embodiments, and particular modifications thereof, it is to be clearly understood that this description is made only by way of example and not as a limitation on the scope of the invention.

What is claimed is:

A body of ferromagnetic ceramic material of high permeability which is the reaction product obtained by heating for a period of two to four hours at a sintering temperature above 1170° C. up to 1280° C. in an atmosphere essentially constituted by an inert gas containing between 0.01 and 1.2% of oxygen, followed by cooling for a period of at least ten hours in an inert atmosphere, a mixture of ferric oxide, an oxide of manganese and zinc oxide the starting mixture of oxides and the heat treatment yielding a final material containing between 49.7 and 50.6 mol. percent of ferric oxide, between 0.3 and 7.5 mol. percent of ferrous oxide, between 25 and 30 mol. percent of manganous oxide and the remainder zinc oxide and in which there is added to the starting mixture of oxides between 0.07 and 0.30% by weight of the molybdenum oxide.

References Cited by the Examiner

UNITED STATES PATENTS

| | | | |
|---|---|---|---|
| 2,736,708 | 2/56 | Crowley | 252—62.5 |
| 3,009,880 | 11/61 | Lessoff | 252—62.5 |

FOREIGN PATENTS

| | | |
|---|---|---|
| 730,703 | 5/55 | Great Britain. |
| 1,125,577 | 7/56 | France. |

MAURICE A. BRINDISI, *Primary Examiner.*